United States Patent [19]

Bonnemann et al.

[11] Patent Number: 5,641,723
[45] Date of Patent: Jun. 24, 1997

[54] PROCESS FOR THE PREPARATION OF HIGHLY ACTIVE DOPED METAL SUPPORTED CATALYSTS

[75] Inventors: Helmut Bonnemann, Essen; Werner Brijoux, Oberhausen; Rainer Brinkmann, Mulheim an der Ruhr; Eckhard Dinjus, Jena; Rainer Fretzen, Gladbeck; Barbara Korall, Krefeld, all of Germany

[73] Assignee: Studiengesellschaft Kohle mbH, Mulheim an der Ruhr, Germany

[21] Appl. No.: 129,183

[22] PCT Filed: Apr. 7, 1992

[86] PCT No.: PCT/EP92/00780

§ 371 Date: Mar. 8, 1994

§ 102(e) Date: Mar. 8, 1994

[87] PCT Pub. No.: WO92/18246

PCT Pub. Date: Oct. 29, 1992

[30] Foreign Application Priority Data

Apr. 10, 1991 [DE] Germany .......................... 41 11 719.0

[51] Int. Cl.$^6$ ........................................... G01J 21/04
[52] U.S. Cl. .................... 502/326; 502/327; 502/152; 502/300
[58] Field of Search ................... 502/325, 326, 502/327, 220, 152, 300

[56] References Cited

U.S. PATENT DOCUMENTS

| 4,102,819 | 7/1978 | Petrow et al. | 502/262 |
| 4,513,098 | 4/1985 | Tsao | 502/216 |
| 4,900,712 | 2/1990 | Bar-Ilan | 502/320 |

*Primary Examiner*—Glenn A. Caldarola
*Attorney, Agent, or Firm*—Sprung Horn Kramer & Woods

[57] ABSTRACT

The present invention relates to a process for preparing highly active doped supported catalysts from an organic or inorganic support material and a catalyst metal precursor, characterized in that the support material is doped with lower-valent readily decomposable metal compounds of at least one metal of groups 4, 5 and/or 6 of the Periodic Table in the presence of solvents prior to or simultaneously with the operation of coating with the catalyst metal precursor in the form of metal particles, metal clusters or metal colloids of at least one metal of groups 6, 7, 8, 9, 10 and/or 11 of the Periodic Table, wherein the metal(s) of the catalyst metal precursor and the metal(s) of the lower-valent metal compound have been derived from different groups of the Periodic Table, optionally followed by an after-treatment with oxygen, and all steps are carried out at a temperature of between −18° C. and +25° C.

The invention further relates to the use of the catalysts prepared by said process.

12 Claims, 3 Drawing Sheets

PROCESS FOR THE PREPARATION OF HIGHLY ACTIVE DOPED METAL SUPPORTED CATALYSTS

The present invention relates to a process for preparing highly active doped supported catalysts of metal of the groups 6 to 11 of the Periodic Table and the use of catalysts prepared by said process.

BACKGROUND OF THE INVENTION

The activity of a heterogeneous metal catalyst is dependent on the particle size, the uniform distribution on the support of the particles and the formation of incomplete crystal structures. Classical preparation methods for heterogeneous metal catalysts are soaking (impregnation) and precipitation.

DESCRIPTION OF THE PRIOR ART

According to the impregnation method, the metal salt is adsorbed, the excessive solution is removed, and the catalyst precursor is dried. The subsequent calcination at from 300° C. to 500° C. in air causes the conversion of the adsorbed metal salt into oxidic products to be effected. The resulting metal oxides will have to be activated by reduction. In this process, a large part of the active component diffuses into the interior of the support particle and, hence, becomes inaccessable to the substrate, especially in liquid phase reactions.

This drawback can be eliminated by precipitating the metal component onto the support. In the ideal case, the active components forms a thin layer on the support particle (shell catalyst). One measure for the fineness of the distribution on the support particle is the ratio of surface metal atoms to the total of metal atoms in % (dispersity) {J. T. Richardson, Principles of Catalyst Development, Plenum Press, New York (1989) 162}. A disadvantage of the above precipitation method is constituted by the very non-uniform local distribution of the active component on the support as well as by a very broad particle size distribution (FIG. 1).

Art atomic metal distribution is also possible on supports. However, such "monoatomically" covered support catalysts have proven to be absolutely inactive in hydrogenations. They fail to exhibit any tendency towards chemisorption and hydrogen dissociation {W. F. Graydon et al., J. Catal. 69 (1981) 180–192}. It is only with an increase in the cluster size that the metal character of the particles is increased {G. Schmid, Aspects of Homogeneous Catalysis, Vol. 7 (1991) pp. 1–36}. The smallest particle size which allows an adsorptive cleave of hydrogen to be achieved represents a threshold value which is affected by the arrangement of the metal atoms {H. Gentsch, Essener Universitätsberichte 1 (1989) 30–34}. For platinum and nickel, these minimum agglomerates comprise 12 metal atoms.

It is the object of the present invention to obtain a uniform covering of the support particle with metal particles having a narrow size distribution by means of a deposition on support surfaces under mild conditions, especially by avoiding any thermal stress, of highly disperse metals, readily decomposable organometal clusters comprising a defined number of metals per cluster or of isolated metal and/or alloy colloids of a described particle size.

Many attempts have been made for this purpose to employ organometal reagents which are readily capable of being reactively bonded to surfaces {Catalyst Design, pp. 71 et seq.; M. Ichikawa, J. Chem. Soc. Chem. Commun. 1976, 26; Y. Yermakov, Catal. Rev. Sci. Engl. 13 (1976) 77}. However, in practice it has shown to be difficult to remove the organic ligands in a defined manner under mild conditions. It is true, the decomposition of mononuclear or organometal complexes of transition metals on the surface produces a highly disperse metal; however, the agglomerates formed therefrom on the surface are too small so that they cannot display any optimal catalytic action. For example, the palladium complex $[C_3H_5PdC_5H_5]$ which has been reactively anchored to activated carbon and then thermally decomposed (particle size below 40 nm) provides only a weak activity in the hydrogenation of vinylacetylene. Larger active metal agglomerates are provided only after sintering the primary particles at temperatures between 200° C. and 600° C. in a $H_2$ atmosphere {Y. A. Ryndin et al., Appl. Catal. 54 (1989) 277–288}. However, the high thermal stress causes a commercially undesirable broad particle size distribution to occur on the surface {B. C. Gates et al., Metal Clusters in Catalysis, Elsevier, Amsterdam 1986; Y. Iwasawa, Ed., Tailored Metal Catalysts, Reidel, Dordrecht 1985; Y. Iwasawa, J. Mol. Catal. 35 (1987) 187; B. C. Gates et al., J. Mol. Catal. 52 (1989) 1}.

The decomposition of organometal cluster compounds on the support has been proposed in order to a priori obtain metal particles which have been sufficiently agglomerated at a narrow size distribution. Thereby, no well-defined clusters are obtained on the surface {K. J. Klabunde et al., Chem. Mater. 3 (1991) 31}.

SUMMARY OF THE INVENTION

Now it has been surprisingly found that a selective deposition under mild conditions of highly disperse metals as well as of metal clusters and metal colloids in a uniformly fine distribution on surfaces can be accomplished by doping with readily decomposable lower-valent compounds of the early transition metals.

Accordingly, the invention relates to a process for preparing highly active doped metal supported catalysts from an organic or inorganic support material and a catalyst metal precursor, said process being characterized in that the support material is doped with lower-valent readily decomposable metal compounds of at least one metal of groups 4, 5 and/or 6 of the Periodic Table in a solution prior to or simultaneously with the operation of coating with the catalyst metal precursor in the form of metal particles, metal clusters or metal colloids of at least one metal of groups 6, 7, 8, 9, 10 and/or 11 of the Periodic Table, wherein the metal(s) of the catalyst metal precursor and the metal(s) of the lower-valent metal compound have been derived from different groups of the Periodic Table, optionally followed by an after-treatment with oxygen, and all steps are carried out at a temperature of between −18° C. and +25° C.

BRIEF DESCRIPTION OF THE DRAWINGS

{FIG. 3: Rhodium colloid, particle size (90%) 0.5–3 nm; FIG. 4: Platinum colloid, particle size (90%) 2–5 nm; FIG. 5: Palladium colloid, particle size (90%) 5–20 nm}.

Figure 1:
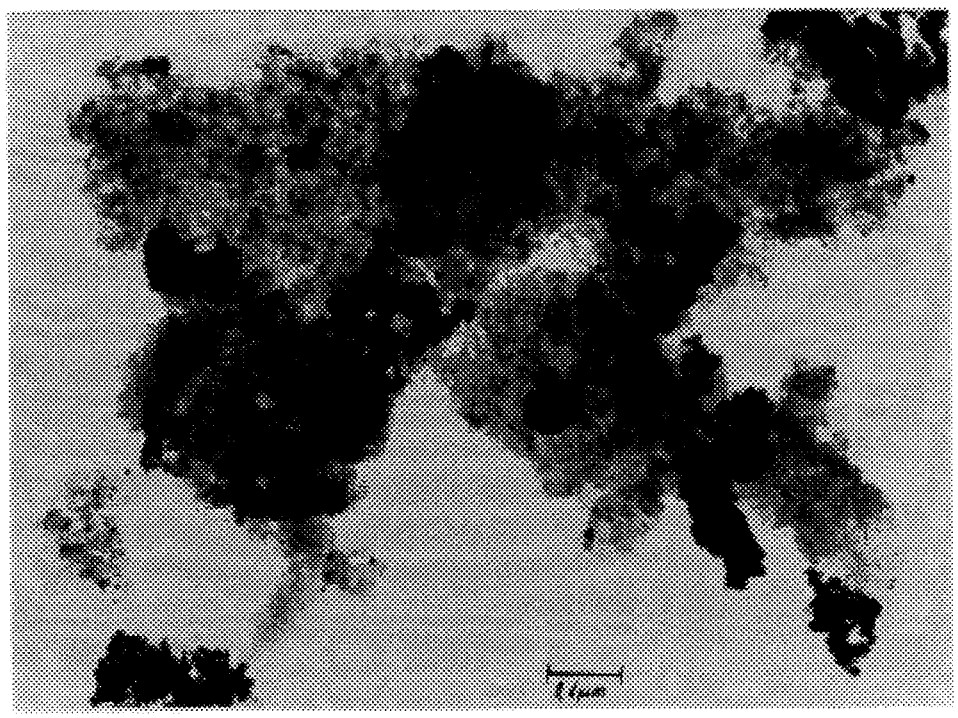
FIG. 1 shows a typical commercially available precipitated catalyst (5% Rh on activated carbon) at a 120,000× enlargement. Besides small metal particles, there are seen large aggregations of Rh agglomerates of up to 1 μm in size on the surface which in part have been weakly bonded and in part have not been bonded at all to the support.

Suitable support materials that may be employed in the process according to the invention are alumina, alkaline earth metal oxides (e.g. of magnesium), magnesium chloride, silica-gel, ceramics, alumosilicates, titanium oxide, zirconium oxide, niobium oxide, oxides of lanthanoids (cerium oxide, lanthanum oxide, neodymium oxide, samarium oxide), activated carbon as well as organic polymers such as, e.g., polystyrene.

Readily decomposable lower-valent compounds of the early transition metals (groups 4, 5 and 6 of the Periodic Table, Ti, Zr, Hf, V, Nb, Ta, Cr, Mo, W) have been sufficiently described in the literature {G. Wilkinson (Ed.), "Comprehensive Organometallic Chemistry", Pergamon Press, Oxford (1982)}.

Mixtures of compounds of different early transition metals can be used for doping (e.g. mixtures of Ti/Hf, Ti/Zr, Zr/Cr). Compounds within the meaning of the invention are those which are decomposed on the support surface at temperatures between −18° C. and +25° C., and preferably at 20° C. Such lower-valent compounds of the early transition metals can also be produced by an in situ reduction of the corresponding metal salts and can be employed for doping according to the invention (Example 15).

The term "lower-valent compounds" of the early transition metals is understood to denote those compounds of said metals wherein the oxidation number is lower than the most stable oxidation number of the respective metal: These include +3, +2, 0 for Ti; +3, +2, +1, 0 for Zr; +4, +3, +2, +1, 0 for V; +4, +3, +2, 0 for Nb, Ta; +2, +1, 0 for Cr; and +3, +2, +1, 0 for Mo, W.

Preferably suitable for doping are the arene compounds of the early transition metals, especially of Ti, Zr, Hf, Nb (F. G. N. Cloke et al., J. Chem. Soc. Chem. Commun. 1978, 431), Cr (P. L. Timms, J. Chem. Soc. Chem. Commun. 1969, 1033), thermolabile cyclopentadienyl complexes such as $Cp_2V$ {K. Handlir et al., Z. Chem. 19 (1979) 256} or olefin-metal complexes such as $(butadiene)_3Mo$ {G. Wilkinson (Ed.)}.

The arenes contemplated for the reactions with the early transition metals are $C_1$–$C_6$-alkyl, $C_1$–$C_6$-alkoxy, $C_1$–$C_6$-dialkyl-amino, fluorobenzenes, which may be up to hexasubstituted, and particularly benzene itself, toluene, o-, m- or p-xylene, mesitylene, hexamethylbenzene, fluorobenzene, anisole.

It is true, there had been known that dispersed metal interact with $TiO_2$ or $ZrO_2$ supports {L. L. Hegedus (Ed.), "Catalyst Design", John Wiley and Sons Inc., New York (1987); S. A. Stevenson (Ed.), "Metal-Support Interactions in Catalysis, Sintering and Redispersion", Van Nostrand Reinhold Company Inc., New York (1987)}. However, this phenomena are not related to doping effects, but they are conventional "metal-support interactions". Y. A. Ryndin et al., {Appl. Catal. 63 (1990) 37–50 and 55 (1989) 109–125} report on the influence of tetravalent metal ions of group 4 of the Periodic Table (PSE) on both noble metal/$SiO_2$ and noble metal/graphite catalysts. However, as the doping metals each are used in the stable oxidation number +4, a particular step such as a thermolysis and/or hydrogenation is required for removing the stable organyl ligand from the metal. A process for directly doping support materials with highly reactive lower-valent compounds of the early transition metals, i.e. without any thermal or hydrogenolytic after-treatment, has not been known hitherto.

Bis-(arene) complexes of zero-valent Ti, Zr or Hf (F. G. N. Cloke et al., J. Chem. Soc. Chem. Commun. 1987, 1667–1668) are readily accessible by a reaction of the metal halides with alkali metal (M) or alkaline earth metal (M') triorganohydroborates of the formula $M[HBR_3]$ or $M'[HBR_3]_2$ (R=$C_1$–$C_6$-alkyl, aryl-$C_1$–$C_6$-alkyl) in the presence of the appropriate arenes, wherein the arenes are as defined above.

Metals of the groups 6 to 11 (corresponding to the groups VIB, VIIB, VIIIB, IB of PSE), more specifically, are: Cr, Mo, W, Mn, Re, Fe, Ru, Os, Co, Rh, Ir, Ni, Pd, Pt, Cu, Ag, Au.

In the present invention, as the catalyst precursor, there is used the tetrameric rhodium cluster $[HRhCOD]_4$ (COD=cyclooctadiene) {M. Kulzick et al., Organometallics 1 (1982) 1256–1258}. Said cluster is prepared by reacting $[XRhCOD]_2$ (X=F, Cl, Br, I) with alkali metal (M) or alkaline earth metal (M') trialkyl hydroborates of the formula $M[HBR_3]$ or $M'[HBR_3]_2$ (R=$C_1$–$C_6$-alkyl, aryl-$C_1$–$C_6$-alkyl). The lipohilic tetramer cluster which is readily soluble in organic solvents is well adsorbed on activated carbon, also on $Al_2O_3$ and other inorganic and organic support materials at regular temperature. The organic ligands are readily removed with hydrogen without any thermal stress at temperatures between −18° C. and +25° C., and preferably at room temperature (20° C.), by exposing the adsorbed $[HRhCOD]_4$ to hydrogen gas. The cyclooctadiene acting as a protective group for the tetranuclear Rh unit is hydrogenated to form cyclooctene and cyclooctane with releasing the rhodium agglomerates. By using alkali metal trialkylorganoborates as hydride transfer agents, $[HRhCOD]_4$ can be readily produced in yields of up to 75% on a commercial scale.

The adsorption of the tetrameric organorhodium complex $[HRhCOD]_4$ onto activated carbon or any other organic or inorganic support materials, each of which has been doped according to the invention, followed by the release with $H_2$ of the metal on the surface of the support, at room temperature provides highly disperse rhodium particles having a narrow size distribution (90% within the range of from 1 to 2 nm) uniformly distributed on the surface, as is evidenced by transmission electron microscopy (TEM). The undesired formation of larger metal agglomerates as it is inevitable in the classical precipitation method (FIG. 1) or upon the action of thermal onto adsorbed organometals for ligand removal {Y. A. Ryndin et al., Appl. Catal. 54 (1989). 277–288} does not occur. Thus, according to the invention the loss of valuable noble m the form of inactive aggregations on the surface can be avoided.

A process for fixing, onto supports, colloidal metals in the form of largely uniform particles of a uniform diameter within a narrow range with the addition of lower-valent metal complexes of the early transition metals has not been known. The German Patent Application No. P 39 34 351.0 of Oct. 14, 1989, describes the preparation of metal colloids of the groups 6 to 11 of the PSE and of colloidal metal alloys comprising at least two different metals by reduction or co-reduction of salts of these metals with tetraalkylammonium triorganohydroborates.

The procedure of performing the reduction or co-reduction according to DE 39 34 351, more specifically, comprises reacting metal salts with $NR''_4(BR_3H)$ or $NR''_4[BR_n(OR')_{3-n}H]$ in an inert organic solvent (e.g. in THF and/or hydrocarbons). Thereupon, the colloidal metals are obtained as red solutions in organic solvents when looked through, from which now powdery metal colloids having a particle size within a narrow range and a uniform shape can be prepared according to the invention by way of a treatment with alcoholic reagents.

Figure 2:
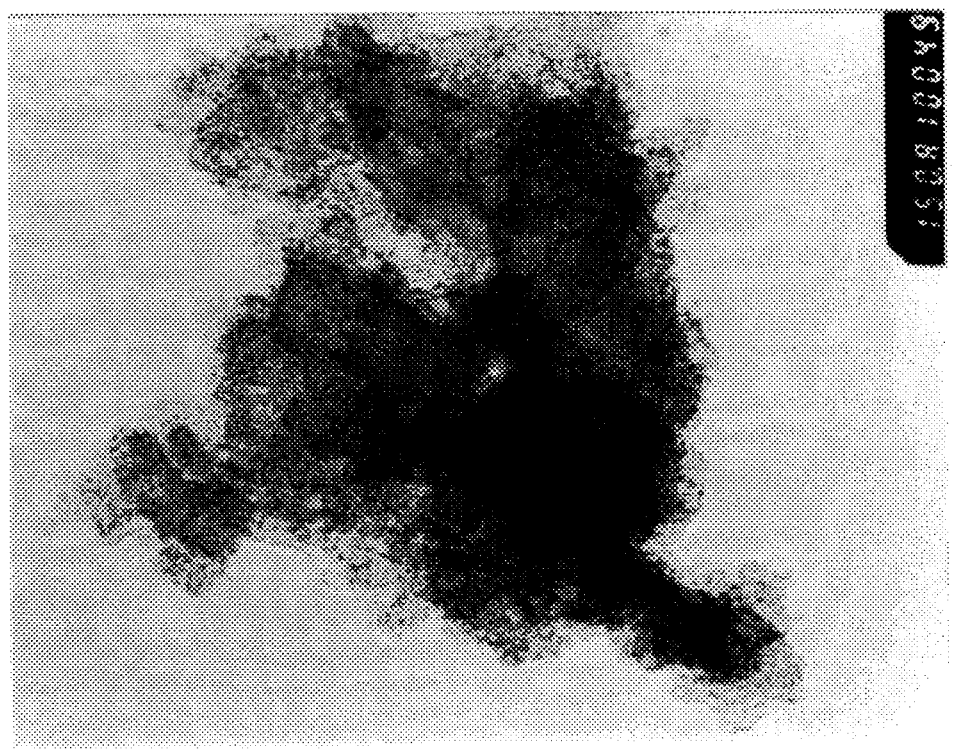
FIG. 2 shows a rhodium colloid catalyst which has been doped with 0.2% of Ti as produced according to the invention (5% Rh colloid on activated carbon) and oxygenated at a 250,000×enlargement (90% of the particles are between 0.5 and 3 nm in size), with the particles uniformly distributed on the support without any agglomerate formation (Example Table 2 No. 8).

The metal colloids or colloidal metal alloys thus prepared can be taken up in various solvents and/or solvent mixtures and, with the addition of the above-identified dopants, can be adsorbed according to the invention on support surfaces. The resulting metal supported catalysts, as is evident from examinations using electron microscopy, contain metal particles having a size within a narrow range in an extremely uniform distribution on the support (FIG. 2). Accordingly, also colloidal metal alloys such as Pt/Rh can be uniformly distributed on supports. Such a catalyst type so far has not been known.

The process according to the invention can be carried out in saturated $C_5$–$C_{10}$ hydrocarbons, aromatic hydrocarbons, ethers, esters and ketones which are liquid within the preferred temperature range. Use is made, more particularly, of n-pentane, hexane, benzene, toluene, THF, diethyl ether, acetone, ethyl acetate or mixtures thereof.

Furthermore, it has been surprisingly found that a partial oxygenation of the metal supported catalysts prepared by the process according to the invention with low amounts of gaseous or dissolved molecular oxygen substantially enhances the stability and activity of the catalysts prepared according to the invention. The oxygenation is accomplished by slowly enriching the environment of the catalyst powder stored under a protective gas with oxygen up to 20% by volume. An oxygenation under mild conditions is also effected by that an $O_2$/inert gas mixture is allowed to flow through the catalyst bed, the $O_2$ concentration of which flowing gas mixture is controlled such as to increase from 0.5% by volume to 20% by volume. According to a third method, the catalyst is oxygenated in solvents which have been saturated with 0.4 ml of oxygen (STP) per 1 ml of solvent. Also the steps of the oxygenation, like all of the other steps, can be carried out in the temperature range of from −18° C. to +25° C., and preferably at 20° C.

The supported metal cluster and colloid catalysts prepared according to the invention may be used with particular advantage for the hydrogenation of unsaturated compounds such as carbon monoxide, CC—, CO—, CN-multiple bond systems as well as for the nucleus hydrogenation of aromatic compounds. Moreover, they are suitable for the selective hydrogenation of natural substances and natural substance mixtures such as soybean oil as well as for the hydrogenolysis of alkanes.

The technical superiority of the new catalysts was demonstrated by way of a comparison of the activities of various rhodium supported catalysts in the hydrogenation of butyronitrile to form butyl amine.

The activity A [ml/g.min] was determined as $$A = \frac{H_2 - \text{volume absorbed [STANDARD CONDITIONS]}}{\text{weight of catalyst} \cdot \text{time of measurement}}.$$

The STANDARD CONDITIONS were as follows: Hydrogen pressure=1 bar; temperature=40°±0.5° C.; starting material concentration=1.04 moles/l; amount of catalyst employed=0.3 to 1 g; stirrer speed=2000 rpm; solvent=100 ml of ethanol. The comparison shows the activity values A obtained under these standard conditions relative to the hydrogenating activity A of a commercially available typical precipitation catalyst [A=83]. All of the systems contain 5% of Rh on an activated carbon support of the same batch. The activity of the precipitation catalyst doped according to the invention with 0.2% of Ti [A=124] was found to be superior to the technical standard by 50%. The activity of the cluster catalyst prepared according to the invention from [HRhCOD]$_4$ [A=102] increases upon doping with titanium according to the invention by 125.5% [A=230] and is superior to prior art [A=83] by 177%. In the case of the colloid catalyst [A=95], doping according to the invention results in an activity increase by 105% [A=195] and in an increase over prior art, for comparison, by 135%.

Doping by the addition of lower-valent complex compounds also exerts a positive effect on the use life of the catalyst. This advantage is illustrated, for example, by a comparison of the catalytic cycles per 1 mole of rhodium catalyst in the hydrogenation of butyronitrile under standard conditions: While the industrial standard catalyst only achieves 5,000 catalytic cycles within 250 hours and is hardly any more active thereafter, a titanium-doped rhodium catalyst according to the invention yields 14,000 cycles in 250 hours at a residual activity of 61 ml of $H_2$ (STP) per 1 g and 1 min. Thus, the rhodium catalyst doped according to the invention provides about three times the conversion of the substrate within 250 hours.

One important advantage of the process according to the invention is the accessability of alloy colloid supported catalysts. Thus, for example, co-reduction of platinum and rhodium salts and subsequent workup according to the invention provides a recoverable solid alloy colloid powder. This powder, by means of the process according to the invention, is dispersed on supports along with doping by lower-valent complex compounds of the early transition metals and in addition thereto is partially oxygenated with $O_2$. Thus, according to the invention there are obtained highly active long-term stable heterogeneous catalysts wherein an expensive noble metal (rhodium) to a substantial portion has been alloyed with one (platinum) or more less expensive such metals.

The following examples illustrate the invention without limiting same.

EXAMPLE 1

Impregnation of activated carbon with metal clusters

In a 500 ml two-neck flask 14.97 g of activated carbon are suspended in about 300 ml of pentane. 1.6556 g (1.95 mmoles) of [HRhCOD]$_4$ as powder are added with thorough stirring. The suspension is stirred at 0° C. for 16 hours, whereby the initially dark-red solution is almost completely discolored. Then the suspension is stepwise concentrated until dry. The evacuated flask is filled with hydrogen. After 1 hour, the hydrogen is removed by aspiration and the catalyst is dried for another 16 hours at room temperature (RT) under high vacuum (IV, $10^{-3}$ mbar).

Yield: 17.56 g; weight of dry matter: 15.77 g.

Solvent portion: 1.79 g=10.2% by weight;

Rhodium content: 5.1% by weight (based on dry matter).

EXAMPLE 2

Shell-like covering of activated carbon with metal clusters 4.56 g of activated carbon are suspended in about 100 ml of pentane at 0° C. with thorough stirring. 50% of a total amount of 0.5176 g (0.61 mmoles) of [HRhCOD]$_4$ is added and the suspension is stirred for another 1.5 hours. With the thorough stirring continued, the mixture is purged with hydrogen for 15 minutes. After the solids have settled, the colorless solution is siphoned, the residue is dried at RT under HV ($10^{-3}$ mbar) for 16 hours. Then, 100 ml of pentane are added, and the remaining amount of [HRhCOD]$_4$ is added with stirring. After 1.5 hours, the suspension is once more purged with hydrogen for 15 minutes, the colorless solution is removed, and the catalyst is dried at RT under HV ($10^{-3}$ mbar) for 16 hours.

Yield: 5.52 g; weight of dry matter: 4.81 g.

Solvent portion: 0.71 g=12.8% by weight;

Rhodium content: 5.1% by weight (based on dry matter).

EXAMPLE 3

Pretreatment of activated carbon with the dopant metals Ti, Zr, V, Nb and Cr.

About 3 g of activated carbon are suspended in solvent, and an appropriate amount of the dopant metal complex, dissolved in the same solvent, is added thereto with stirring. Once the solution has been completely discolored, the activated carbon is allowed to settle and the supernatant metal-free solvent is removed by siphoning. The residue is dried under IV ($10^{-3}$ mbar) for 16 hours to produce the activated carbon having the corresponding content of the dopant metal and a residual solvent content of about 10%.

For full absorption (cf. Table 1, No. 9), the activated carbon was removed by filtration over a G4 glass frit from the non-discolored solvent and washed two times with 10 ml of n-pentane each; after drying, 6.98% of Ti had been absorbed on the activated carbon.

After drying for 16 h under HV ($10^{-3}$ mbar), the COD is removed by hydrogenation with H$_2$ from the resulting support-complex adsorbate. After another 16 h of drying under HV ($10^{-3}$ mbar), there are obtained 3.51 g of catalyst according to method a) and 3.64 g of catalyst according to method

EXAMPLE 5 a) Impregnation of titanium-pretreated activated carbon with metal clusters

In a 250 ml two-neck flask 7.66 g of activated carbon which has been pretreated with Ti according to Table 1, No. 4, are suspended in about 150 ml of pentane. 0.8443 g (1.00 mmoles) of [HRhCOD]$_4$ as powder are added with thorough stirring. The suspension is stirred at 0° C. for 16 hours, whereby the initially dark-red solution is almost completely discolored. Then the suspension is stepwise concentrated until dry. The evacuated flask is filled with hydrogen. After 1 hour, the hydrogen is removed by aspiration and the activated catalyst is dried for another 16 hours at RT under HV ($10^{-3}$ mbar).

Yield: 9.16 g; weight of dry matter: 8.05 g.

Solvent portion: 1.11 g=12.1% by weight;

Rh content: 5.1% by weight (based on dry matter);

Ti content: 0.2% by weight (based on dry matter).

b) Impregnation with metal clusters of activated carbon which has been pretreated with Zr, V, Nb or Cr.

TABLE 1

| No. | Metal complex | Activated carbon mg | Activated carbon g | Solvent | Metal content ml | Metal content % | Time |
|---|---|---|---|---|---|---|---|
| 1 | Bis(toluene)titanium | 3.3 | 3.27 | Pentane | 50 | 0.02 | 10 min |
| 2 | " | 7.7 | 3.02 | " | 50 | 0.05 | 10 min |
| 3 | " | 16 | 3.11 | " | 50 | 0.1 | 10 min |
| 4 | " | 31 | 3.03 | " | 50 | 0.2 | 10 min |
| 5 | " | 65 | 3.18 | " | 50 | 0.4 | 20 min |
| 6 | " | 160 | 3.12 | " | 100 | 1 | 1 h |
| 7 | " | 316 | 3.04 | " | 100 | 2 | 2 h |
| 8 | " | 824 | 3.07 | " | 150 | 5 | 4 h |
| 9 | " | 605 | 0.835 | " | 150 | Full absorption | 7 d |
| 10 | Bis($\eta^6$-1,3,5-tris-tert-butyl-benzene)zirconium | 41.5 | 3.07 | Benzene | 1000 | 0.2 | 20 min |
| 11 | Bis($\eta^5$-cyclopentadienyl)-vanadium | 23.5 | 3.13 | THF | 1000 | 0.2 | 20 min |
| 12 | Bis($\eta^6$-benzene)niobium | 17.1 | 3.02 | Benzene | 1000 | 0.2 | 20 min |
| 13 | Bis($\eta^6$-benzene)chromium | 25.7 | 3.04 | Benzene | 2000 | 0.2 | 20 min |

*Calculated on catalyst dry matter basis.

EXAMPLE 4

Coating activated carbon with 0.2% of Ti and 5% of Rh in combination 3.00 g of activated carbon are suspended in 30 ml of pentane, and a solution of 30.6 mg of bis(toluene)titanium and 1.30 g of [HRhCOD]$_4$ in pentane (especially purified by several recondensation and degassing steps) is added thereto with stirring. Depending on the duration of the action onto the activated carbon of the solution, an impregnation catalyst (method a) or a shell catalyst (method b) can be prepared.

Method a: After stirring for 16 h, the pentane is distilled off at RT under HV ($10^{-3}$ mbar).

Method b: After stirring for 1 h, the amount of complex as still dissolved is brought onto the support by concentrating the solution.

In the same manner as above, however using an activated carbon which has been pretreated according to Table 1, Nos. 10, 11, 12 or 13, there is obtained a catalyst comprising 5% of Rh and 0.2% (based on dry matter) of the respective dopant metal (Zr, V, Nb or Cr).

EXAMPLE 6

Covering according to the conventional method of activated carbon pretreated with titanium.

15.31 g of activated carbon which has been pretreated with Ti according to Table 1, No. 4, are suspended in about 300 ml of distilled water. After the addition of 2.1163 g (8.04 mmoles) of RhCl$_3$ ·3 H$_2$O, the suspension is heated at 90° C. While the suspension is thoroughly stirred, 70 ml of a 0.35 M NaOH are added in the course of 3 h. Stirring is continued for 1 h, and then the suspension is allowed to cool to 50° C.

$H_2$ is passed through the suspension for 16 h, and then solids are removed by filtration over a D4-frit and the filter cake is washed with distilled water several times. The catalyst is dried for 16 hours at RT under HV ($10^{-3}$ mbar).

Yield: 24.23 g; weight of dry matter: 16.11 g.

Solvent portion: 8.12 g=33.5% by weight;

Rh content: 5.1% by weight (based on dry matter);

Ti content: 0.2% by weight (based on dry matter).

EXAMPLE 7

1. Preparation of rhodium colloid

To a suspension of 2.79 g (13.33 mmoles) of $RhCl_3$ in 500 ml of THF there are dropwise added at 40° C. with stirring under a protective gas 100 ml of a 0.4-molar solution of $N(C_8H_{17})_4BEt_3H$ in THF in the course of 1 hour. Heating at 40° C. is continued for another 2 hours, whereupon the $RhCl_3$ is completely dissolved. After stirring overnight at room temperature there is obtained a completely clear dark red-black colored reaction solution. All volatiles are removed from the clear solution in vacuo at room temperature, and after 3 h of drying at 40° C. under HV ($10^{-3}$ mbar) there are obtained 22.25 g of a black-brown waxy residue. It is soluble in THF, ether, toluene, acetone, insoluble in ethanol and contains 6.1% of Rh.

2. Workup and recovery of the rhodium colloid

The residue obtained in 1. is dissolved under air in 500 ml of ether technical grade, and 50 ml of a non-denatured ethanol are added whereupon a grey-brown precipitate is formed. The precipitate is allowed to settle for 1 h, and the supernatant clear solution is forced off with a protective gas (argon) from the precipitate. The precipitate is washed two times with a mixture of 90 ml of ether/10 ml of ethanol, and after drying in vacuo (20 min, RT) there are obtained 1.24 g of a grey rhodium colloid powder (Rh: 61.05%; N: 0.61%; C: 17.26%; H: 2.61%; B: 0.67%). It is very well soluble in THF, well soluble in acetone, less soluble in toluene, insoluble in ether.

Figure 3:
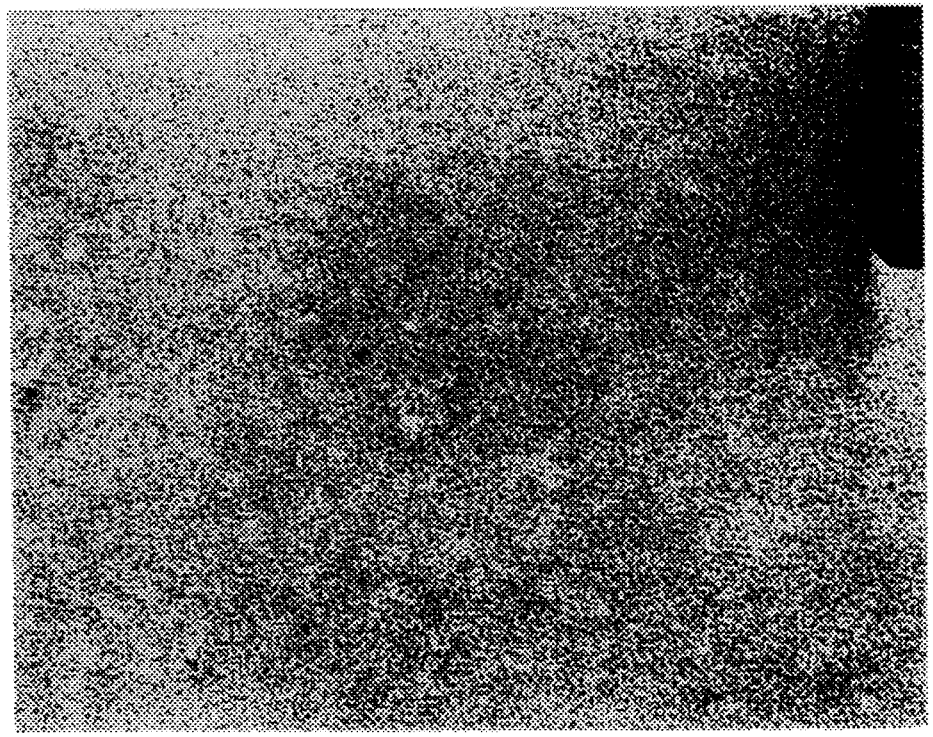
FIGS. 3 through 5: Metal colloids having a uniformly described particle size at a 250,000×enlargement prepared in powder form

Particle size as per TEM photographs: 0.5 to 3 nm (cf. FIG. 3).

EXAMPLE 8

1. Preparation of platinum colloid 9.87 g (37.11 mmoles) of $PtCl_2$ are suspended under a protective gas in 1000 ml of THF, and 200 ml of a 0.371-molar solution (74.2 mmoles) of $N(C_8H_{17})_4BEt_3H$ in THF are added thereto with stirring at RT in the course of 2 hours. Hereby the $PtCl_2$ is dissolved to form a deep brown-black reaction mixture. After stirring overnight, all undissolved matter is filtered off over a D4-glass frit. Amount of the precipitate: 2.3 g of Pt metal (11.8 mmol). All volatiles are removed from the clear filtrate in vacuo at RT, and after 3 h of drying at 40° C. under HV ($10^{-3}$ mbar) there are obtained 46.2 g of a black-brown viscous residue which solidifies after some time. It is soluble in THF, ether, toluene, acetone, insoluble in ethanol and contains 10.5% of Pt.

2. Workup and recovery of the platinum colloid

To 34.9 g of the residue described in 1. there are added and well admixed therewith under air 1600 ml of ether technical grade. 160 ml of a non-denatured ethanol are added whereupon a grey-brown precipitate is formed. The precipitate is allowed to settle for about ½ h, and the supernatant bright yellow clear solution is forced off with argon from the precipitate. The precipitate is washed with a mixture of 60 ml of ether/6 ml of ethanol, and after drying in vacuo (20 min, RT) there are obtained 3.5 g of a grey-black platinum colloid powder (Pt: 64.46%; N: 0.71%; C: 23.44%; H: 4.52%; B: 0.32%). It is very well soluble in THF, less soluble in toluene, insoluble in acetone and ether.

ESCA analysis: bonding energy $Pt(4f_{7/2})$=69.6 eV.

Figure 4:
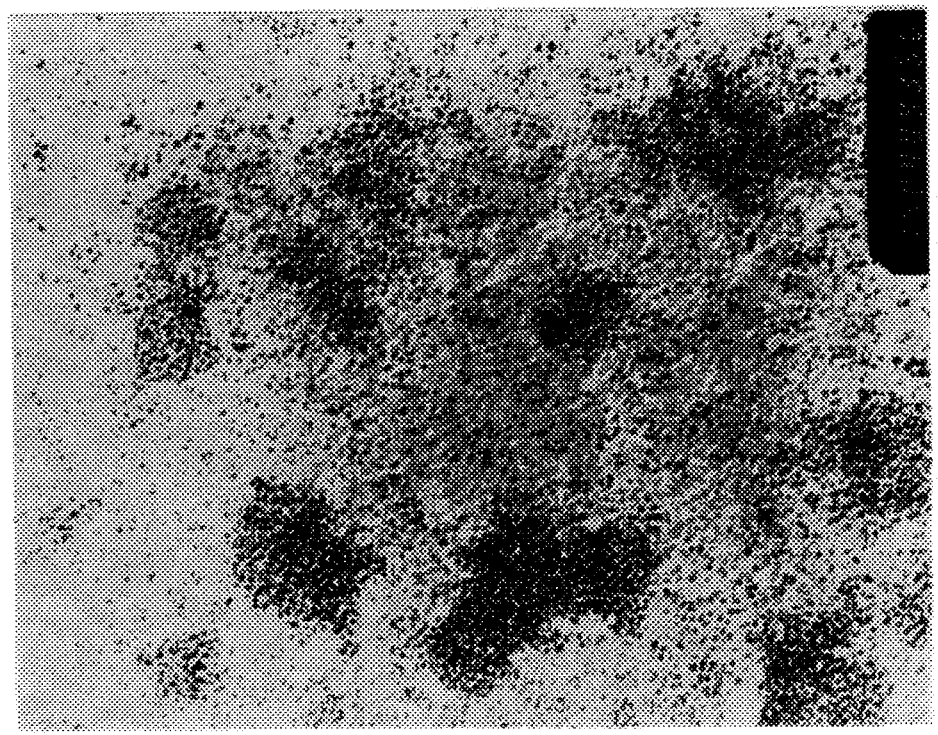

Particle size as per TEM photographs: 2 to 5 nm (cf. FIG. 4).

EXAMPLE 9

1. Preparation of ruthenium colloid

To a mixture of 3.46 g (16.2 mmoles) of $RuCl_3$ in 400 ml of THF there are dropwise added at 40° C. with stirring under a protective gas 200 ml of a 0.252-molar solution of $N(C_8H_{17})_4BEt_3H$ in THF in the course of 2 hours. Heating at 50° C. is continued for another 2 hours, whereupon the $RuCl_3$ is dissolved. After stirring overnight at room temperature there is obtained a clear dark red-black colored reaction solution. The mixture is filtered through a D4-glass frit in order to remove any undissolved matter, and all volatiles are removed from the clear solution in vacuo at room temperature, and after 3 h of drying at 30° C. under HV ($10^{-3}$ mbar) there are obtained 26.62 g of a black-brown waxy residue. It is soluble in THF, ether, toluene, acetone, sparingly soluble in ethanol and contains 6.15% of ruthenium.

2. Workup and recovery of the ruthenium colloid

The residue obtained in 1. is dissolved under air in 950 ml of ethanol technical grade, and 80 ml of pentane technical grade are added whereupon a grey-brown precipitate is formed. The precipitate is allowed to settle for 1 h, and the supernatant clear solution is forced off with a protective gas (argon) from the precipitate. The precipitate is washed two times with a mixture of 100 ml of ethanol technical grade/10 ml of pentane technical grade, and after drying in vacuo (20 min, RT) there are obtained 2.36 g of a grey ruthenium colloid powder (Ru: 68.72%; N: 0.59%; C: 19.8%; H:2.79 %; B: 0.35%). It is very well soluble in THF, well soluble in acetone, less soluble in toluene, insoluble in ether.

Particle size as per TEM photographs: 1 to 5 nm.

EXAMPLE 10

1. Preparation of palladium colloid

To a suspension of 3.52 g (19.8 mmoles) of $PdCl_2$ in 500 ml of THF there are dropwise added at RT with stirring under a protective gas 100 ml of a 0.347-molar solution of $N(C_8H_{17})_4BEt_3H$ in THF in the course of 1 hour. In the course thereof the $PdCl_2$ is completely dissolved. After stirring overnight there is obtained a completely clear deep brown-black reaction solution. All volatiles are removed therefrom in vacuo at RT, and after 3 h of drying at 30° C. under HV ($10^{-3}$ mbar) there are obtained 21.45 g of a black-brown highly viscous residue. It is soluble in THF, ether, toluene, acetone, insoluble in ethanol and contains 9.8% of Pd.

2. Workup and recovery of the palladium colloid 14.3 g of the residue described in 1. are taken up under air in a mixture comprising 320 ml of ether technical grade/30 ml of a non-denatured ethanol and well shaken. The insolubles are allowed to settle for about 1 h, and the supernatant solution is forced off with a protective gas (argon) from the dark grey-brown precipitate. The precipitate is washed with 100 ml of ether/10 ml of ethanol, and after drying in vacuo (20 min, RT) there are obtained 1.5 g of a dark grey palladium colloid powder (Pd: 83.62%; N: 0.28%; C: 8.72%; H: 2.64%; B: 0.54%). It is very well soluble in THF, well soluble in acetone, less soluble in toluene, insoluble in ether.

Figure 5:
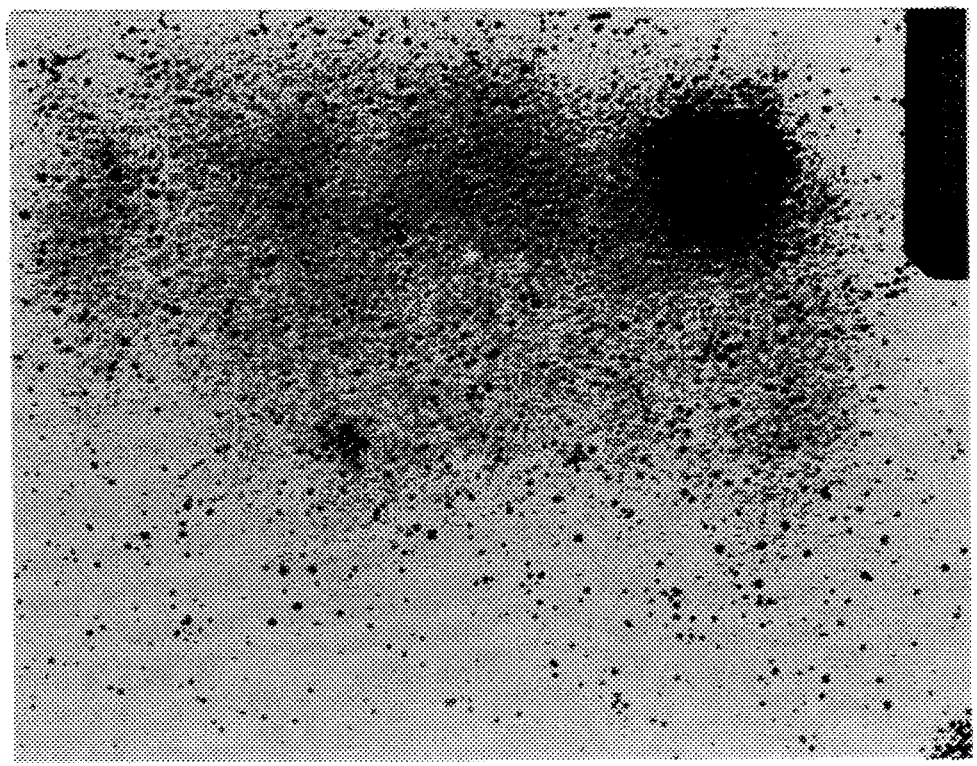

Particle size as per TEM photographs: 5 to 20 nm (cf. FIG. 5).

EXAMPLE 11

Preparation of a Pd colloid 0.25 g of $PdCl_2$ and 1.56 g of $N(C_8H_{17})_4Br$ are heated in 30 ml of THF under reflux for 16 hours. The $PdCl_2$ is dissolved and a deep red solution is formed. The product is dried overnight under HV ($10^{-3}$ mbar), and a red solid is obtained (Pt: 7.7%; N: 2.9%; C: 60.5%; H: 10.6%; $C_{1.5.6}$%; Br: 11.3%).

The red solid is dissolved in 70 ml of THF. The solution thus obtained which contains 2.143 mg/ml of Pd is stirred at room temperature und hydrogen at a pressure of 1 bar for 14 days. Colloidal dissolved Pd is obtained.

EXAMPLE 12

1. Preparation of rhodium-platinum colloid 2.1 g (10.03 mmoles) of $RhCl_3$ and 2.68 g (10.03 mmoles) of $PtCl_2$ are suspended under a protective gas in 630 ml of THF, and 127 ml of a 0.397-molar solution (50.15 mmoles) of $N(C_8H_{17})_4BEt_3H$ in THF are added thereto with stirring at 50° C. in the course of 1 hour. Hereby the salts are dissolved to form a deep red-black reaction mixture. After stirring overnight, all undissolved matter is filtered off over a D4-glass frit. 0.2 g of a precipitate are obtained (containing, by elemental analysis, 95% of Pt and 1% of Rh). All volatiles are removed from the clear filtrate in vacuo at RT, and after 3 h of drying at 40° C. under HV ($10^{-3}$ mbar) there are obtained 25.5 g of a brown-black waxy residue. It is soluble in THF, ether, toluene, acetone, insoluble in ethanol and contains 3.9% of Rh and 6.8% of Pt.

2. Workup and recovery of the rhodium-platinum colloid

To 5.1 g of the residue described in 1. there are added under air 180 ml of ether technical grade and 20 ml of a non-denatured ethanol, whereupon a grey-brown precipitate is formed. The precipitate is allowed to settle for about ½ h, and the supernatant clear solution is forced off with protective gas (argon) from the precipitate. The precipitate is washed with a mixture of 50 ml of ether/5 ml of ethanol, and after drying in vacuo (20 min, RT) there are obtained 0.42 g of a black-grey rhodium-platinum colloid powder (Rh: 24.09%; Pt: 24.45%; N: 0.3%; C: 12.02%; H: 1.74%; B: 1.00%). It is very well soluble in THF, less soluble in acetone, insoluble in ether and toluene.

Particle size as per TEM photographs: 0.5 to 3 nm.

EXAMPLE 13

1. Preparation of nickel colloid

To a suspension of 4.19 g (19.2 mmoles) of $NiBr_2$ in 550 ml of THF there are dropwise added with stirring under a protective gas 150 ml of a 0.256-molar solution of $N(C_8H_{17})_4BEt_3H$ in THF at RT in the course of 30 minutes. When stirred overnight, the $NiBr_2$ is completely dissolved, and an absolutely clear black-red colored reaction solution is formed. All volatiles are removed therefrom in vacuo at RT, and after 3 h of drying at 30° C. under HV ($10^{-3}$ mbar) there are obtained 22.31 g of a brown-black solid residue. It is soluble in THF, acetone, toluene, less soluble in ethanol and insoluble in ether and contains 4.9% of Ni.

2. Workup and recovery of the nickel colloid 10.81 g of the residue obtained in 1. are dissolved under a protective gas in 380 ml of absolute ethanol, and 40 ml of absolute ether are added. The precipitated grey-brown matter is allowed to settle for about 1 h, and the supernatant clear solution is forced off. The precipitate is washed with a mixture comprising 100 ml of ethanol/10 ml of ether, and after drying in vacuo (20 min, RT) there are obtained 0.35 g of a grey-black nickel colloid powder (Ni: 66.13%; N: 0.32%; C: 13.96%; H: 2.62%; B: 0.59%). It is very well soluble in THF, well soluble in toluene, insoluble in ethanol and ether.

Particle size as per TEM photographs: 5 to 20 nm.

EXAMPLE 14

Covering activated carbon with metal colloids

Approximately from 2 to 4 g of activated carbon (which has been left untreated or has been pretreated with titanium according to Table 1, No. 3) are suspended in about 50 ml of absolute THF, and an appropriate amount of metal colloid, dissolved in THF, is added thereto. The mixture is stirred overnight, followed by filtration over a D4-frit from the absolutely colorless metal-free solution, and activated carbon covered with the metal colloid is dried for 16 hours at RT under HV ($10^{-3}$ mbar), whereafter about 10% of the solvent remain adsorbed. Thus, metal contents of from 0.1% to 10% can be adjusted. All of the catalysts as specified in Tables 2 through 5 contain 5% of noble metal (relative to solvent-free product).

TABLE 2

Rhodium colloid on activated carbon

| No. | Activated carbon Weighed amount g | Ti content* % | Colloid employed | Weighed amount mg | Oxygenated according to Example 18 |
|---|---|---|---|---|---|
| 1 | 2.56 | — | according to Example 7.1 | 2208 | — |
| 2 | 3.08 | — | according to Example 7.2 | 265 | — |
| 3 | 3.13 | 0.05 | according to Example 7.2 | 243 | — |
| 4 | 2.95 | 0.05 | according to Example 7.2 | 229 | + |
| 5 | 2.51 | 0.1 | according to Example 7.2 | 195 | — |
| 6 | 2.49 | 0.1 | according to Example 7.2 | 193 | + |
| 7 | 3.11 | 0.2 | according to Example 7.2 | 243 | — |
| 8 | 3.02 | 0.2 | according to Example 7.2 | 234 | + |
| 9 | 2.59 | 0.4 | according to Example 7.2 | 200 | — |
| 10 | 2.44 | 0.4 | according to Example 7.2 | 190 | + |
| 11 | 2.07 | 1 | according to Example 7.2 | 162 | — |
| 12 | 2.18 | 1 | according to Example 7.2 | 170 | + |

*Calculated on catalyst dry matter basis.

TABLE 3

Platinum colloid on activated carbon

| No. | Activated carbon Weighed amount g | Ti content* % | Colloid employed | Weighed amount mg | Oxygenated according to Example 18 |
|---|---|---|---|---|---|
| 1 | 3.51 | — | according to Example 8.1 | 1760 | — |
| 2 | 2.02 | — | according to Example 8.2 | 165 | — |
| 3 | 2.54 | 0.2 | according to Example 8.2 | 187 | — |
| 4 | 2.49 | 0.2 | according to Example 8.2 | 183 | + |
| 5 | 3.13 | 1 | according to Example 8.2 | 233 | — |
| 6 | 2.98 | 1 | according to Example 8.2 | 221 | + |
| 7 | 2.01 | 5 | according to Example 8.2 | 156 | — |
| 8 | 2.21 | 5 | according to Example 8.2 | 171 | + |

*Calculated on catalyst dry matter basis.

TABLE 4

Palladium colloid on activated carbon

| No. | Activated carbon Weighed amount g | Ti content* % | Colloid employed | Weighed amount mg | Oxygenated according to Example 18 |
|---|---|---|---|---|---|
| 1 | 3.51 | — | according to Example 10.1 | 1885 | — |
| 2 | 3.50 | 0.2 | according to Example 10.1 | 1695 | — |
| 3 | 3.55 | 0.2 | according to Example 10.1 | 1720 | + |
| 4 | 2.01 | 1 | according to Example 10.1 | 982 | — |
| 5 | 2.09 | 1 | according to Example 10.1 | 1021 | + |
| 6 | 3.48 | — | according to Example 10.2 | 219 | — |
| 7 | 2.54 | 0.2 | according to Example 10.2 | 144 | — |
| 8 | 2.38 | 0.2 | according to Example 10.2 | 135 | + |
| 9 | 1.98 | 1 | according to Example 10.2 | 114 | — |
| 10 | 2.10 | 1 | according to Example 10.2 | 120 | + |

*Calculated on catalyst dry matter basis.

TABLE 5

Rhodium-platinum colloid on activated carbon

| No. | Activated carbon Weighed amount g | Ti content* % | Colloid employed | Weighed amount mg | Oxygenated according to Example 18 |
|---|---|---|---|---|---|
| 1 | 3.54 | — | according to Example 12.2 | 385 | — |
| 2 | 2.17 | 0.4 | according to Example 12.2 | 213 | + |

*Calculated on catalyst dry matter basis.

EXAMPLE 15

Preparation of a highly active rhodium supported catalyst from rhodium colloid and reduced titanium in solution To a solution of 6.68 g (20 mmoles) of $TiCl_4 \cdot 2$ THF in 250 ml of THF there are dropwise added with stirring at 40° C. 70 ml of a 1.15-molar solution (80 mmol) of $K[BEt_3H]$ in THF within 2 hours. About 450 ml (STP) (20 mmoles) of $H_2$ are evolved which are collected in a gas burette. Upon the completion of the addition, stirring is continued at 40° C. for another 30 minutes. The precipitated KCl is removed by filtration over a D4-glass frit and washed with small THF portions until the effluent THF is colorless. The grey residue is dried under oil pump vacuum for 16 hours. $BEt_3$ and THF are removed from the brown filtrate, the residue is taken up in 50 ml of THF and separated from undissolved matter by filtration. The black-brown solid which precipitates upon the addition of pentane to the filtrate is filtered off and dried under oil pump vacuum for 16 hours. Yield: 1.68 g of reduced titanium.

1.668 g of activated carbon are suspended in 30 ml of THF, and 8.3 mg of reduced titanium (42.6% Ti), dissolved in 20 ml of THF, are added to the stirred suspension. Upon complete discoloration of the solution (about 5 minutes), 52 ml of a rhodium-colloid solution in THF (1.695 mg/ml of Rh) are added to the stirred solution. The mixture is stirred overnight, and the solid is removed from the absolutely colorless metal-free solution by filtration over a D4-glass frit. The catalyst is dried at RT under oil pump vacuum for 16 hours. The catalyst is oxygenated by purging with argon containing 0.2% by volume of $O_2$ for 16 hours.

Yield: 2.021 g; dry matter: 1.760 g; solvent content: 12.9 %.

Rh content: 5.0% by weight (based on the solvent-free catalyst);

Ti content: 0.2% by weight (based on the solvent-free catalyst).

EXAMPLE 16

Preparation of highly active noble metal supported catalysts on inorganic support materials In the same manner as in Example 3, Table 1, No. 4, about 3 g of support material are covered with Ti, and Rh is subsequently applied onto the support in the same manner as in Example 5. Thereafter, the catalyst contains 5% of Rh and 0.2% of Ti (based on dry matter).

TABLE 6

| No. | Support material | g | Bis(toluene)titanium mg | [HRhCOD]$_4$ mg |
|---|---|---|---|---|
| 1 | TiO$_2$ | 3.12 | 31.8 | 339 |
| 2 | Al$_2$O$_3$ | 3.07 | 31.3 | 334 |

EXAMPLE 17

Covering with nickel colloid of Al1203 pretreated with titanium.

1.176 g of nickel colloid (according to Example 13.2) are dissolved under a protective gas in 150 ml of THF, and 6.0 g of Al$_2$O$_3$ which has been pretreated with Ti in the same manner as in Table 1 No. 3 are added with stirring. Stirring is conducted for about 3 hours, and the solvent is stripped off. After drying at RT under HV ($10^{-3}$ mbar) for 3 hours there is obtained an Al$_2$O$_3$ comprising 12% of nickel and 0.1% of Ti (based on dry matter).

EXAMPLE 18

Oxygenation with gaseous oxygen 60 g of a rhodium activated carbon catalyst (5% by weight of rhodium) produced under a protective gas are charged onto a D3-frit (d=40 mm). The catalyst bed is purged with 500 ml/min of an argon/oxygen mixture containing 0.2% by volume of O$_2$. The gas mixture is produced by introducing a metered amount of O$_2$ into the Ar stream. The mixing ratio is controlled by two previously calibrated rotameters, one of which is located in the Ar stream and the other one of which is located in the O$_2$ stream.

A thermoelement vertically movable inside the catalyst bed (measuring accuracy 1/10° C.) does not show any temperature change in the bed caused by the pre-selected O$_2$ concentration. The O$_2$ concentration is stepwise increased to 0.5% by volume within 1 hour. In the course thereof the temperature of the catalyst top layer increases by 8° C. This temperature zone moves in the flow direction through the bed having a depth of 12 cm within 16 hours. After its breakthrough, the O$_2$ content in the gas stream is increased to 20% by volume within 2 hours.

The temperature increase recorded thereupon is below 2° C.

EXAMPLE 19

Oxygenation with dissolved oxygen 5 g of a pyrophoric rhodium activated carbon catalyst (5% by weight of rhodium) are suspended in 200 ml of pentane. The stirred suspension is purged with oxygen (about 10 ml/min) at 0° C. for 16 hours. Then the catalyst is removed by filtration over a D4-frit and is dried at RT under HV ($10^{-3}$ mbar) for 16 hours.

EXAMPLE 20

Determination of the initial hydrogenating activity of rhodium catalysts (5% of Rh) by means of the apparatus described in Scheme 1 using butyronitrile as the substrate A weighed amount of 0.1904 g of the rhodium catalyst (Table 7, No. 5) is filled into the 100 ml dropping funnel under inert conditions, the dropping funnel is placed on the apparatus, and the whole apparatus is several times evacuated and (re-)filled with hydrogen. Then the catalyst in the dropping funnel is suspended in 50 ml of ethanol (air-free, DAB 7) and introduced into the apparatus, followed by an after-rinse with another 50 ml of ethanol. The apparatus is permanently purged with hydrogen. Then the catalyst suspension is heated at a temperature of 40° C. (thermostat, ±0.2° C.) and stirred at 2,000 rpm. After balancing the pressures, the path towards a mercury-sealed precision gas burette (200 ml) is opened. Then 10 ml of butyronitrile (distilled under argon) are injected into the catalyst suspension through the septum. The hydrogen consumption per minute is recorded. 1st minute: 46 ml; 2nd minute: 44 ml; 3rd minute: 42 ml; 4th minute: 39 ml. The calculated amount of ml under standard conditions of temperature and pressure (STP) of H$_2$ per minute is 39.33 ml/min (STP). In consideration of the solvent content in the catalyst of about 10% the real amount of catalyst is 0.1714g. Therefrom a catalyst activity is calculated of (STP) 230 ml/g·min of H$_2$. In accordance with this Example, the initial hydrogenating activities as set forth in the following Table 7 were measured and calculated.

TABLE 7

Initial hydrogen activities of rhodium catalysts (Rh content: 5%; substrate: butyronitrile)

| No. | Catalyst origin | Pretreatment | Weighed amount g | Hydrogenation H$_2$ consumption ml/min (STP) | Activity ml/g · min (STP) |
|---|---|---|---|---|---|
| 1 | Example 1 | | 0.2274 | 20.9 | 102 |
| 2 | Example 1 | oxygenated | 0.2563 | 38.5 | 167 |
| 3 | Table 1, No. 1$^b$ | 0.02% Ti | 0.2436 | 27.2 | 124 |
| 4 | Table 1, No. 1$^b$ | 0.02% Ti$^a$ | 0.2018 | 36.4 | 200 |
| 5 | Table 1, No. 4$^b$ | 0.2% Ti$^a$ | 0.1904 | 39.3 | 230 |
| 6 | Table 1, No. 7$^b$ | 2% Ti | 0.2376 | 28.01 | 131 |
| 7 | Table 1, No. 7$^b$ | 2% Ti$^a$ | 0.1795 | 31.5 | 195 |
| 8 | Example 4$^d$ | 0.2% Ti | 0.1762 | 14.3 | 90 |
| 9 | Example 4$^d$ | 0.2% Ti$^a$ | 0.2618 | 32.3 | 137 |
| 10 | Example 4$^e$ | 0.2% Ti$^a$ | 0.3276 | 25.4 | 120 |
| 11 | Table 2, No. 1 | | 0.3191 | 12.33 | 43 |
| 12 | Table 2, No. 2 | | 0.2344 | 20.1 | 95 |
| 13 | Table 2, No. 3 | 0.05% Ti | 0.2308 | 13.4 | 64 |
| 14 | Table 2, No. 4 | 0.05% Ti$^a$ | 0.1593 | 23.4 | 163 |
| 15 | Table 2, No. 5 | 0.1% Ti | 0.2042 | 12.5 | 68 |
| 16 | Table 2, No. 6 | 0.1% Ti$^a$ | 0.1513 | 23.9 | 175 |
| 17 | Table 2, No. 7 | 0.2% Ti | 0.2273 | 24.2 | 123 |

TABLE 7-continued

Initial hydrogen activities of rhodium catalysts (Rh content: 5%; substrate: butyronitrile)

| No. | Catalyst origin | Pretreatment | Weighed amount g | Hydrogenation H$_2$ consumption ml/min (STP) | Activity ml/g · min (STP) |
|---|---|---|---|---|---|
| 18 | Table 2, No. 8 | 0.2% Ti[a] | 0.2750 | 30.7 | 195 |
| 19 | Table 2, No. 9 | 0.4% Ti | 0.1644 | 10.7 | 73 |
| 20 | Table 2, No. 10 | 0.4% Ti[a] | 0.1735 | 16.7 | 107 |
| 21 | Table 2, No. 11 | 1% Ti | 0.1777 | 7.4 | 46 |
| 22 | Table 2, No. 12 | 1% Ti[a] | 0.2289 | 21.5 | 104 |
| 23 | Example 15 | 0.2% Ti[a] | 0.2025 | 38.0 | 215 |
| 24 | Example 5b | 0.2% Nb[a] | 0.2548 | 39 | 175 |
| 25 | Example 5b | 0.2% Cr[a] | 0.1966 | 31.8 | 180 |
| 26 | Example 6 | 0.2% Ti[a] | 0.2712 | 30.3 | 124 |
| 27 | Table 6, No. 1 | 0.2% Ti[a] | 0.4210 | 37.5 | 99 |

[a]oxygenated;
[b]in the same manner as in Example 5;
[c]Method a);
[d]Method b).

EXAMPLE 21

Determination of the initial hydrogenating activity of platinum activated carbon catalysts by means of the apparatus described in Scheme 1 using crotonic acid as the substrate A weighed amount of 0.1597 g of the platinum catalyst (Table 8, No. 4) is filled into the 100 ml-dropping funnel, the dropping funnel is placed on the apparatus, and the whole apparatus is several times evacuated and (re-)filled with hydrogen. Then the catalyst in the dropping funnel is suspended in 20 ml of ethanol (DAB 7, thermostat-controlled temperature of 25° C.) and introduced into the hydrogenation apparatus. Then 80 ml of a solution of 72.6 g of crotonic acid in 1 l of ethanol (also thermostated at 25° C.) were pipetted into the dropping funnel and also introduced into the hydrogenation apparatus, followed by an after-rinse with 20 ml of ethanol. The catalyst is thermostated at 25° C. (±0.2° C.). During the filling operations the hydrogenation apparatus is permanently purged with hydrogen. The gas-introducing stirrer is not yet operating. After balancing the pressures, the path towards a 1 l-precision gas burette (mercury-sealed, coupled to a recorder) is opened, and the stirrer is activated to a speed of 2000 rpm. The hydrogen consumption is recorded over six minutes, whereof the 1st minute is not utilized for the evaluation. Between the 2nd and 6th minutes, a hydrogen consumption of 500 ml is measured. The calculated consumption under standard conditions of temperature and pressure (STP) is 92 ml/min (STP). In consideration of a solvent content in the catalyst of 10%, a catalyst activity is calculated of 640 ml/g·min (STP). In accordance with this Example, the initial hydrogenating activities as set forth in the following Table 8 were determined and calculated.

TABLE 8

Initial hydrogen activities of platinum colloid on activated carbon (Pt content: 5%; substrate: crotonic acid)

| No. | Catalyst origin | Pretreatment | Weighed amount g | Hydrogenation H$_2$ consumption ml/min (STP) | Activity ml/g · min (STP) |
|---|---|---|---|---|---|
| 1 | Table 3, No. 1 | | 0.2271 | 79.12 | 387 |
| 2 | Table 3, No. 2 | | 0.2046 | 76.4 | 415 |
| 3 | Table 3, No. 3 | 0.2% Ti | 0.1790 | 78.2 | 485 |
| 4 | Table 3, No. 4 | 0.2% Ti[a] | 0.1597 | 92 | 640 |
| 5 | Table 3, No. 5 | 1% Ti | 0.2425 | 146.3 | 671 |
| 6 | Table 3, No. 6 | 1% Ti[a] | 0.1475 | 106.7 | 804 |
| 7 | Table 3, No. 7 | 5% Ti | 0.1093 | 8.1 | 45 |
| 8 | Table 3, No. 8 | 5% Ti[a] | 0.1692 | 59.8 | 393 |

[a]oxygenated.

EXAMPLE 22

Determination of the initial hydrogenating activity of palladium activated carbon catalysts by means of the apparatus described in Scheme 1 using cinnamic acid as the substrate In the same manner as in Example 21, the test is carried out using a suspension of 0.2226 g of palladium catalyst (Table 9, No. 3) in 50 ml of ethanol and 50 ml of a 0.843 molar ethanolic solution of cinnamic acid (126 g/l of cinnamic acid) as the substrate. The hydrogen consumption was 533 ml, corresponding to 98.1 ml/min (STP). The catalyst activity in consideration of a solvent content of 10% is found to be 490 ml/g·min (STP). The initial hydrogenating activities of various Pd catalysts as set forth in Table 9 were determined and calculated in accordance with this described Example.

TABLE 9

Initial hydrogen activities of Pd colloid on activated carbon (Pd content: 5%; substrate: cinnamic acid)

| No. | Catalyst origin | Pretreatment | Weighed amount g | Hydrogenation $H_2$ consumption ml/min (STP) | Activity ml/g · min (STP) |
|---|---|---|---|---|---|
| 1 | Table 4, No. 1 |         | 0.1457 | 46   | 350 |
| 2 | Table 4, No. 2 | 0.2% Ti | 0.2331 | 95.3 | 454 |
| 3 | Table 4, No. 3 | 0.2% Ti* | 0.2226 | 98.1 | 490 |
| 4 | Table 4, No. 4 | 1% Ti   | 0.2603 | 92   | 393 |
| 5 | Table 4, No. 5 | 1% Ti*  | 0.1750 | 77   | 489 |
| 6 | Table 4, No. 9 | 1% Ti   | 0.1869 | 20.6 | 122 |

*oxygenated.

EXAMPLE 23

Determination of the use life of metal supported catalysts (e.g. Rh) by means of the hydrogenating apparatus described in Scheme 2 using butyronitrile as the test substrate A weighed amount of 0.5647 g of the rhodium catalyst (Table 7, No. 2) is filled into the 100 ml dropping funnel under argon, the dropping funnel is placed on the apparatus, and the whole apparatus is several times evacuated and (refilled with $H_2$. Then the catalyst in the dropping funnel is suspended in 50 ml of ethanol (air-free, DAB 7) and introduced into the apparatus, followed by an after-rinse with another 50 ml of ethanol (see above). The apparatus is permanently purged with $H_2$. Then the catalyst suspension is heated at a temperature of 40° C. (thermostat, ±0.5° C.) and stirred at 2,000 rpm. After balancing the pressures, the path towards a $H_2$ supply (0.2 1, 100 bar) is opened, and the pressure is adjusted to 1.0 bar by means of a reducing valve. 30 ml of butyronitrile (distilled under argon) are injected into the catalyst suspension through the septum. The hydrogen consumption is recorded by the recorder as pressure drop in the auto-clave. If no further pressure drop is noted, the hydrogen supply is stopped, and the apparatus is purged with argon. The catalyst suspension is siphoned into a centrifuge vessel and is centrifuged under argon at 2000 rpm for 30 min. The supernatant is siphoned off, and the catalyst is dried under HV ($10^{-3}$ mbar) for 4 hours. The dry catalyst is suspended in 100 ml of ethanol (see above) and again siphoned into the apparatus. After rinsing with $H_2$, the test for use life is continued as described above. When the residual activity measured in the beginning of a batch falls below a minimum value of 20 ml/g·min (STP), the test for use life is considered to have been terminated.

The following values were measured for the Rh catalyst Table 7, No. 2 in five runs:

| Run No. | $A_{30\,min}$ ml/g · min (STP) | TON $H_2$/Rh [moles/moles] at 95% turnover | Time hours |
|---|---|---|---|
| 1 | 135 | 2 850 | 16  |
| 2 | 105 | 2 880 | 40  |
| 3 | 71  | 2 880 | 67  |
| 4 | 34  | 2 775 | 164 |
| 5 | 19  | 2 790 | 304 |

The activity $A_{30\,min}$ conforms to the $H_2$ consumption after 30 minutes of hydrogenation time, relative to the amount of catalyst employed.
TON = turnover number (conversion number).

The tests for use life as set forth in the following Table 10 have been measured and calculated according to this Example.

TABLE 10

Tests for use life

| No. | Catalyst type | Weighed amount g | TON $H_2$/Rh [moles/moles] (95% turnover/run) | Time hours |
|---|---|---|---|---|
| 1 | Table 7, No. 2 | 0.5647 | 14 175 | 591 |
| 2 | Table 7, No. 5 | 0.5758 | 8 403  | 156 |
| 3 | Example 4, Method b) | 0.6313 | 9 922 | 137 |
| 4 | Example 4, Method a) | 0.5971 | 13 641 | 274 |

EXAMPLE 24

Hydrogenation of iso-nonanal using a nickel colloid catalyst on aluminum oxide

A 500 ml autoclave equipped with stirring means is charged under argon with 270 ml of i-nonanal, technical grade (produced by hydroformylation of i-butene), and 5 g of nickel colloid catalyst on aluminum oxide which contains 12% of Ni and 0.1% of Ti (cf. Example 17). The autoclave is pressurized at room temperature with 25 bar of $H_2$ and is then magnetically stirred and heated at 130° C. for 5 hours, whereby the pressure increases to 80 bar. After cooling to room temperature, the autoclave is depressurized, and the reaction mixture is discharged under protective gas. After filtration, the evaluation by gas chromatography of the product showed a conversion of 98.2% and a selectivity of 98.7% for i-nonanol. The proportion of undesirable higher-boiling by-products (products of aldolization, esters, higher ethers="thick oil") was 1.3%.

What is claimed is:

1. A method for preparation of a highly active doped metal supported catalyst, which consist essentially of the steps of
   a) doping a support material with a solution of an easily decomposable compound of a metal from Groups 4,5 and/or 6 of the Periodic Table and having a valence below its maximum possible valence, the support material being free of surface hydroxyl groups and adsorbed water,
   b) coating the doped support with a precursor of the doping metal, the metal of said precursor being from Group 6 to 11 of the periodic Table and being of a different Group than the metal of said easily decomposable compound,
   c) thereafter, optionally treating the support with oxygen and,
   d) drying, steps (a), (b) and (c) being effected at from −18° to +25° C.

2. Method according to claim 1, wherein magnesium chloride, lanthanum oxide, cerium oxide, neodymium oxide, samarium oxide, ceramic, active carbon or organic polymers are used as support material.

3. Method according to claim 1, wherein bis-arene compounds, cyclopentadienyl complex compounds or olefin-metal complex compounds are used as said metal compounds of group 4, 5 or 6 of the Periodic System with valency below the maximum valency.

4. Method according to claim 1, wherein Said precursor is a metal colloid and said metal colloid is a colloidal metal alloy of at least two different metals.

5. Method according to claim 1, wherein a rhodium colloid with a particle size distribution (transmission election microscopy, TEM) of 90% between 0.5 and 3 nm is used as said precursor.

6. Method according to claim 1, wherein said precursor is a platinum colloid with a particle size distribution (TEM) of 90% between 2 and 5 nm.

7. Method according to claim 1, wherein said precursor is a platinum/rhodium colloid with a particle size distribution (TEM) of 90% between 0.5 and 3 nm.

8. Method according to claim 1, wherein said precursor is a palladium colloid with a particle size distribution (TEM) of 90% between 5 and 20 nm.

9. Method according to claim 1, wherein said precursor is a nickel colloid with a particle size distribution (TEM) of 90% between 5 and 20 nm.

10. Method according to claim 1, wherein said precursor is a ruthenium colloid with a particle size distribution (TEM) of 90% between 1 and 5 nm.

11. Method according to claim 1, wherein the metal support catalyst is partially oxygenated by the addition of small amounts of or gaseous oxygen dissolved in a solvent.

12. In a process for the catalytic hydrogenation of unsaturated compounds, nuclear hydrogenation of aromatic compounds, hydrogenation of carbon monoxide or hydrogenation of alkanes, the improvement wherein the highly-reactive, doped metal support catalyst of claim 1 is used as the catalyst.

* * * * *